United States Patent Office 3,251,808
Patented May 17, 1966

3,251,808
PROCESS FOR THE MANUFACTURE OF GASOLINE-SOLUBLE AND HIGH-MELTING RESINS AND RESULTING PRODUCTS
Josef Kaupp and Erich Hambsch, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed June 4, 1962, Ser. No. 199,668
Claims priority, application Germany, June 8, 1961, F 34,108
10 Claims. (Cl. 260—61)

The present invention relates to a process for the manufacture of gasoline-soluble and high-melting resins.

Resinous products are known which are obtained by reacting bis-chloromethyl-alkylbenzenes with at least 2 mols of alkylphenols (German Patent 1,092,027). If 1,4-dimethyl-2,5-bis-chloromethyl-benzene is reacted with m-cresol there is obtained bis-(2-hydroxy-4-methylbenzyl)-xylene, which is practically insoluble in white spirit. When a phenol is used having an alkyl radical of higher molecular weight, for example, p-tertiary butylphenol, gasoline-soluble resins are obtained which have so low a melting point that they can be used on a limited scale only as lacquer binding media. Still further, their extremely high antioxidative properties forbid the concomitant use of air-drying oils.

Furthermore, there are known resinous products obtained by reacting bis-chloromethyl-alkylbenzene with at least 2 mols of a bis-phenol, as well as epoxy resins produced by etherifying polyhydric phenols with bis-chloromethyl-benzene and then reacting the product obtained with halogeno-hydrins. However, the substances thus obtained are insoluble or only sparingly soluble in gasoline.

It has now been found that gasoline-soluble resins can be produced, the lower limit of the melting range of which is above 80° C., by reacting in known manner, suitably in the presence of Friedel-Crafts catalysts, preferably zinc dust, bis-chloromethyl-benzenes, which may carry alkyl groups in the nucleus, with a terpene phenol obtained by additively combining terpene hydrocarbons, especially pinene and/or camphene, with phenols or with a mixture of such a terpene phenol with phenol which may have an aliphatic side chain, preferably in para position, and, if desired, hydrogenating the product obtained for reducing antioxidative properties the product may have.

Suitable starting materials are, for example, xylylene dichloride, bis-chloromethyl-toluene, bis-chloromethyl-xylene, bis-chloromethyl-cymene, bis-chloromethyl-durene and bis-chloromethyl-sec-butylbenzene. These compounds can be produced in known manner by chloromethylating the appropriate alkylbenzene with formaldehyde and hydrochloric acid, or, for example, the xylylene dichloride, preferably by chlorinating the side chains of xylene. It is of advantage to use bis-chloromethyl-xylene obtained by chloromethylating commercial xylene.

The terpene phenol used as second reaction component is prepared in known manner by reacting molar amounts of phenol and terpene hydrocarbons, especially pinene and/or camphene in the presence of boron fluoride acetic acid as catalyst (German Patent 971,720). The catalyst can be removed by distillation with steam if in the reaction with bis-chloromethyl-alkylbenzene a selfcondensation of the latter compound shall be avoided. The terpene phenol can be used in distilled form or as crude product.

As third reaction component there can be used phenol and alkyl-phenols having an aliphatic side chain preferably with 1 to 12 carbon atoms, for example cresol, sec-butylphenol, tert-butylphenol, isononylphenol, or dodecyl-phenol. In the interest of a high melting point of the resulting resin it is preferred to use para-substituted phenols. Of course, a mixture of various phenols may likewise be used.

In most cases the phenols are used in an excess with respect to the chloromethyl derivative, for example in a molar ratio of 1:1.2 to 1:2, preferably 1:1.2 to 1:1.4. If phenols are used having longer alkyl chains it may be necessary to use molar amounts or an excess of chloromethyl derivative in order to obtain products having a high melting point.

For substantially avoiding a self-condensation of the chloromethyl compound it is of advantage to perform the reaction in an inert solvent and, especially when alkylphenols are used concomitantly, to introduce the catalyst after the termination of the evolution of hydrogen chloride. With the use of low proportions of phenol as indicated above the reaction takes place to a large extent when carried out at a temperature above about 60° C. to 70° C. and up to 150° C. In general, the reaction is carried out at a temperature in the range of 100° C. to 150° C. It is, therefore, advantageous to use high boiling solvents such as white spirit, dichlorobenzene or trichlorobenzene. When the temperature has dropped to 40° C. to 50° C. a catalyst is added, preferably zinc dust. The reaction is completed at raised temperature, the reaction mixture becoming simultaneously brighter under the influence of the zinc dust. An optimum brightening is obtained at a temperature above 160° C. After having separated the catalyst by filtration or washing and eliminated the solvent under reduced pressure, a clear, bright and chlorine-free resin is obtained if a bright starting material has been employed.

A further mode of execution consists in adding the catalyst prior to the beginning of the reaction. In this case the chloromethyl compound should advantageously be added in portions at moderately elevated temperature or in dissolved form, for example as a solution in ortho-dichlorobenzene, the reaction temperature being gradually increased in the course of the reaction. It is likewise possible to conduct the reaction in the absence of a catalyst, in this case the presence of a higher excess of phenols being of advantage.

For brightening dark resins and/or eliminating or reducing antioxidative properties the products may have they can be subjected to a hydrogenation, for example at a temperature in the range of 150° C. to 300° C. under a pressure of 100 to 300 atmospheres in the presence of known catalysts. For the hydrogenation the resins need not be isolated if they were prepared in a solvent that is inert towards hydrogen.

The products prepared by the present process are soluble not only in gasoline hydrocarbons but also in aromatic hydrocarbons, chlorinated aliphatic and aromatic hydrocarbons, such as ethylene chloride, trichloroethylene, dichlorobenzene; in alcohols, ethers, esters and amides, such as cyclohexanol, ethyl diglycol, acetone, diacetone alcohol, butyl acetate and dimethyl formamide. They are well compatible with self-drying oils, dry rapidly to clear films and are thus well suitable as lacquer binding media.

The following examples serve to illustrate the invention but they are not intended to limit it thereto. The melting intervals have been determined by the capillary method described in DIN Standard Specification 53,181 of June 1956.

*Example 1*

Phenol and camphene were condensed as described in Example 1 of German Patent 971,720 to yield a soft terpene phenol resin and the resin was subjected to a fractionating distillation. The monoterpene phenol had a boiling point of about 160° C. under a pressure of 0.4 mm. of mercury and distilled over in the form of a yellowish syrup.

1106 grams (4.8 mols) of the distilled monoterpene phenol,
1000 grams of white spirit having a boiling range of 155 to 210° C., and
50 grams of zinc dust were heated at an internal temperature of 50 to 55° C. and, while stirring,
813 grams (4.0 mols) of bis-chloromethyl-xylene, prepared by chloromethylating commercial xylene at 70° C. with paraformaldehyde and concentrated hydrochloric acid, were introduced in portions in the course of 2 to 3 hours. At the beginning the temperature was maintained at 50 to 55° C. and later on i was slowly raised to 80 to 90° C. so that the evolution of hydrogen chloride was always moderate only. The addition being terminated, the reaction mixture was heated for 30 minutes with reflux,
30 grams of calcined soda were introduced for neutralizing the hydrogen chloride, the hot mixture was filtered through a pressure filter and washed with white spirit. After having removed the solvent under a pressure of 0.5 mm. of mercury at a bath temperature of 200° C. there were obtained,
1530 grams of a light, yellowish, clear resin which was readily soluble in white spirit and had a melting interval of 92° C. to 100° C.

The resin was dissolved in the same amount of white spirit, 7% of Raney nickel were added and the mixture was hydrogenated at 250° C. under a pressure of 220 atmospheres. 100 grams of resin absorbed 53 liters of hydrogen. An almost colorless, clear resin was obtained which was readily soluble in white spirit and had a melting point or 103° C. to 110° C.

*Example 2*

200 grams of the terpene phenol resin described in Example 1 of German Patent 971,720,
180 grams of bis-chloromethyl-xylene, prepared by chloromethylation of commercial xylene at 70° C. with formalin and concentrated hydrochloric acid, and
300 grams of ortho-dichlorobenzene were heated in the same measure as hydrogen chloride was evolved and refluxed for 10 hours. The mixture was then cooled until an internal temperature of 40 to 50° C. was reached,
20 grams of zinc dust were added, the mixture was cautiously heated to reflux temperature and refluxed for 30 minutes. The hot reaction mixture was filtered through a pressure filter and the solvent was removed under a pressure of about 0.5 mm. of mercury at a bath temperature of 200° C. 337 grams of a brown, clear resin were obtained which was readily soluble in white spirit and had a melting point in the range of 125° C. to 132° C.

The resin was dissolved in the same amount of white spirit, 10% of Raney nickel were added and the mixture was hydrogenated at 270° C. under a pressure of 300 atmospheres. 100 grams of resin absorbed 50 liters of hydrogen. A light resin was obtained which was readily soluble in white spirit and had a melting point of 125 to 135° C.

*Example 3*

480 grams of the terpene phenol resin described in Example 1 of German Patent 971,720,
320 grams of para-sec. butylphenol,
720 grams of bis-chloromethyl-xylene, prepared by chloromethylation of commercial xylene at 70° C. with paraformaldehyde and concentrated hydrochloric acid,
800 grams of white spirit boiling at 155 to 210° C. were slowly heated, while stirring, in the same measure as hydrogen chloride was evolved until the reflux temperature was reached, the mixture was refluxed for 12 hours, cooled to 40 to 50° C.,
40 grams of zinc dust were added and the whole was again slowly heated and refluxed for 30 minutes,
20 grams of soda were added, the hot mixture was filtered through a pressure filter and washed with toluene. After having removed the solvent under reduced pressure,
1315 grams of a light brown, clear resin were obtained which was soluble in gasoline and had a melting point of 92 to 100° C.

The resin was hydrogenated as described in Example 2 at 270° C. and under a pressure of 120 atmospheres. 100 grams of resin absorbed 58 liters of hydrogen. An almost colorless, clear resin was obtained which was soluble in white spirit and had a melting point of 95 to 102° C.

*Example 4*

A mixture of
100 grams of isononylphenol,
100 grams of crude terpene phenol resin,
180 grams of bis-chloromethyl-xylene,
200 grams of white spirit,
40 grams of zinc dust, and
20 grams of calcined soda was treated as described in Example 3.

A brown, clear and gasoline-soluble resin was obtained which had a melting point of 85 to 92° C. The resin was hydrogenated as described in Example 2 at 270° C. and under a pressure of 300 atmospheres. 100 grams of resin absorbed 43 liters of hydrogen. A light, clear resin was obtained which was soluble in white spirit and had a melting point of 82 to 90° C.

*Example 5*

A mixture of
253 grams (1.1 mols) of distilled terpene phenol resin (as described in Example 1),
28 grams (0.3 mol) of phenol,
203 grams (1.0 mol) of bis-chloromethyl-xylene,
200 grams of white spirit,
40 grams of zinc dust, and
20 grams of calcined soda was treated as described in Example 3.

A light brown, clear, gasoline-soluble resin having a melting point of 93 to 102° C. was obtained which was hydrogenated as described in Example 4. 100 grams of resin absorbed 64 liters of hydrogen. A colorless, clear and gasoline-soluble resin was obtained which had a melting point of 101 to 120° C.

*Example 6*

A mixture of
239 grams (1.0 mol) of crude terpene phenol (as defined in Example 1 of German Patent 971,720),
32 grams (0.3 mol) of commercial cresol mixture,
203 grams (1.0 mol) of bis-chloromethyl-xylene,
200 grams of white spirit,
40 grams of zinc dust, and
20 grams of calcined soda was treated as described in Example 3.

A brown, hard and clear resin was obtained which had a melting point of 122 to 134° C. and was soluble in white spirit. The product was hydrogenated as described in Example 4. 100 grams of resin absorbed 71 liters of hydrogen. An almost colorless, clear and gasoline-soluble resin was obtained which had a melting point of 109 to 124° C.

*Example 7*

Preparation of the terpene phenol:

940 grams (10 mols) of phenol were melted, 20 grams of a solution of boron fluoride in glacial acetic acid were added, the mixture was heated to 100° C. and, while stirring at 100 to 110° C., 1700 grams (12.5 mols) of α-pinene were dropped in. When the exothermal reaction had subsided, the mixture was stirred for a further 3 hours at 130° C., cooled to 80–90° C. and for destroying the catalyst a solution of 40 grams of caustic soda in 160 cc. of water was added. Under a pressure of about 15 mm. of mercury the water and excess phenol were distilled off up to a bath temperature of 150° C. 2400 grams of a light brown resin were obtained which had a melting point of about 55° C., a molecular weight of about 500, a hydroxyl number of 119 mg. KOH/g. substance (the active hydrogen was determined). 230 grams of phenol were recovered.

1000 grams of the terpene phenol obtained as described above,
360 grams of bis-chloromethyl-xylene,
1000 grams of white spirit,
20 grams of zinc dust, and
10 grams of calcined soda were treated as described in Example 3.
1170 grams of a brown, hard and clear resin were obtained which had a melting point of 100 to 117° C. and was soluble in white spirit.

*Example 8*

A terpene phenol was prepared as described in Example 7, but instead of α-pinene there was used the same amount of an American sulfate-turpentine oil containing 66% of α-pinene, 22% of β-pinene, 2% of camphene, 7% of dipentene and 1% of β-phellandrene, which had been deodorized with sodium hypochlorite. 2500 grams of a light brown resin were obtained which melted at about 55° C. and had a hydroxyl number of 150. 160 grams of phenol were recovered.

A mixture of
1200 grams of the terpene phenol obtained,
360 grams of bis-chloromethyl-xylene,
1200 grams of ortho-dichlorobenzene,
20 grams of zinc dust,
10 grams of calcined soda was treated as described in Example 3.
1400 grams of a light brown, hard and clear resin were obtained which had a melting point of 110 to 120° C. and was soluble in white spirit.

The resin was hydrogenated as described in Example 4. An almost colorless, clear and gasoline-soluble resin was obtained which melted at 100 to 112° C.

We claim:

1. A process for the manufacture of gasoline-soluble resins having a melting range from above 80° C. to 135° C. which process comprises reacting in an inert solvent containing a Friedel-Crafts catalyst and at a temperature above 60° C. (1) a terpene-phenol in liquid form, obtained by additively combining molar amounts of a terpene hydrocarbon of 10 carbon atoms and phenol with (2) a compound of the formula

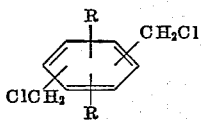

R being a member selected from the group consisting of hydrogen and an alkyl group with 1–4 carbon atoms.

2. The process of claim 1 wherein the chloromethylated compound (2) is reacted with said terpene-phenol (1), and (3) at least one phenol of the formula

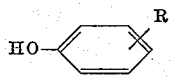

R being a member selected from the group consisting of hydrogen and an alkyl-group with 1–12 carbon atoms.

3. The process of claim 1 wherein the terpene-phenol is obtained by combining pinene with phenol.

4. The process of claim 1 wherein the terpene-phenol is obtained by combining camphene with phenol.

5. The process of claim 1 wherein zinc dust is used as catalyst.

6. The process of claim 1 wherein the reaction temperature is in the range from 100 to 150° C.

7. The process of claim 1 wherein the reaction product is hydrogenated in the presence of a hydrogenation catalyst at a temperature of 150–300° C. and at 100–300 atmospheres.

8. Gasoline-soluble resins having a melting range from above 80° C. to 135° C. and being produced by reacting in an inert solvent containing a Friedel-Crafts catalyst at a temperature above 60° C. (1) a terpene-phenol in liquid form, obtained by additively combining molar amounts of a terpene-hydrocarbon of 10 carbon atoms and phenol with (2) a compound of the formula

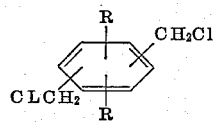

R being a member selected from the group consisting of hydrogen and an alkyl-group with 1–4 carbon atoms.

9. Gasoline-soluble resins according to claim 8 produced by reacting the terpene-phenol (1) and said chloromethylated compound (2) and (3) at least one phenol of the formula

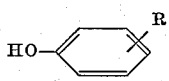

R being a member selected from the group consisting of hydrogen and an alkyl group with 1–12 carbon atoms.

10. The hydrogenation product produced by the process of claim 7.

References Cited by the Examiner

UNITED STATES PATENTS

| | | | |
|---|---|---|---|
| 2,123,898 | 7/1938 | Hönel et al. | 260—62 |
| 2,129,153 | 9/1938 | Schirm | 260—619 |
| 2,154,192 | 4/1939 | Zinke | 260—62 |
| 3,001,972 | 9/1961 | Christenson et al. | 260—619 |
| 3,026,297 | 3/1962 | Spacht | 260—619 |
| 3,062,896 | 11/1962 | Davis | 260—619 |

FOREIGN PATENTS

| | | |
|---|---|---|
| 534,821 | 2/1952 | Canada. |
| 971,720 | 3/1959 | Germany. |
| 885,005 | 12/1961 | Great Britain. |

WILLIAM H. SHORT, *Primary Examiner.*

L. M. MILLER, H. D. ANDERSON,
*Assistant Examiners.*